United States Patent [19]

Buck

[11] 4,403,782

[45] Sep. 13, 1983

[54] PUSH-TYPE JAW CHUCK

[75] Inventor: James R. Buck, Hickory Corners, Mich.

[73] Assignee: Buck Tool Company, Cape Coral, Fla.

[21] Appl. No.: 229,694

[22] Filed: Jan. 30, 1981

[51] Int. Cl.³ .......................................... B23B 31/16
[52] U.S. Cl. ..................................................... 279/121
[58] Field of Search .................... 279/121, 122, 123, 4, 279/110, 120

[56] References Cited

U.S. PATENT DOCUMENTS

| | | | |
|---|---|---|---|
| 2,845,276 | 7/1958 | Skillin | 279/121 |
| 2,845,277 | 7/1958 | Skillin | 279/121 |
| 3,424,467 | 1/1969 | Buck | 279/121 |
| 3,792,869 | 2/1974 | Braun | 279/121 X |
| 3,992,019 | 11/1976 | Crawshay | 279/121 |
| 4,123,075 | 10/1978 | Rosewarne et al. | 279/121 |

Primary Examiner—William R. Briggs
Attorney, Agent, or Firm—Flynn, Thiel, Boutell & Tanis

[57] ABSTRACT

A jaw chuck provided with an inner sleevelike housing which, at its forward end, is provided with radially extending T-shaped slots which slidably accommodate the jaw carriers. The inner housing is totally surrounded and fixedly connected to an outer sleevelike housing which overlaps the outer ends of the slots. A push-type activator is disposed adjacent the rearward end of the inner housing and is axially slidable relative thereto. This activator includes wedges which project axially forwardly and are slidably and wedgably engaged with the jaw carriers for effecting radial displacement thereof. The wedges have the outer peripheries thereof axially slidably supported on the inner periphery of the outer housing.

5 Claims, 7 Drawing Figures

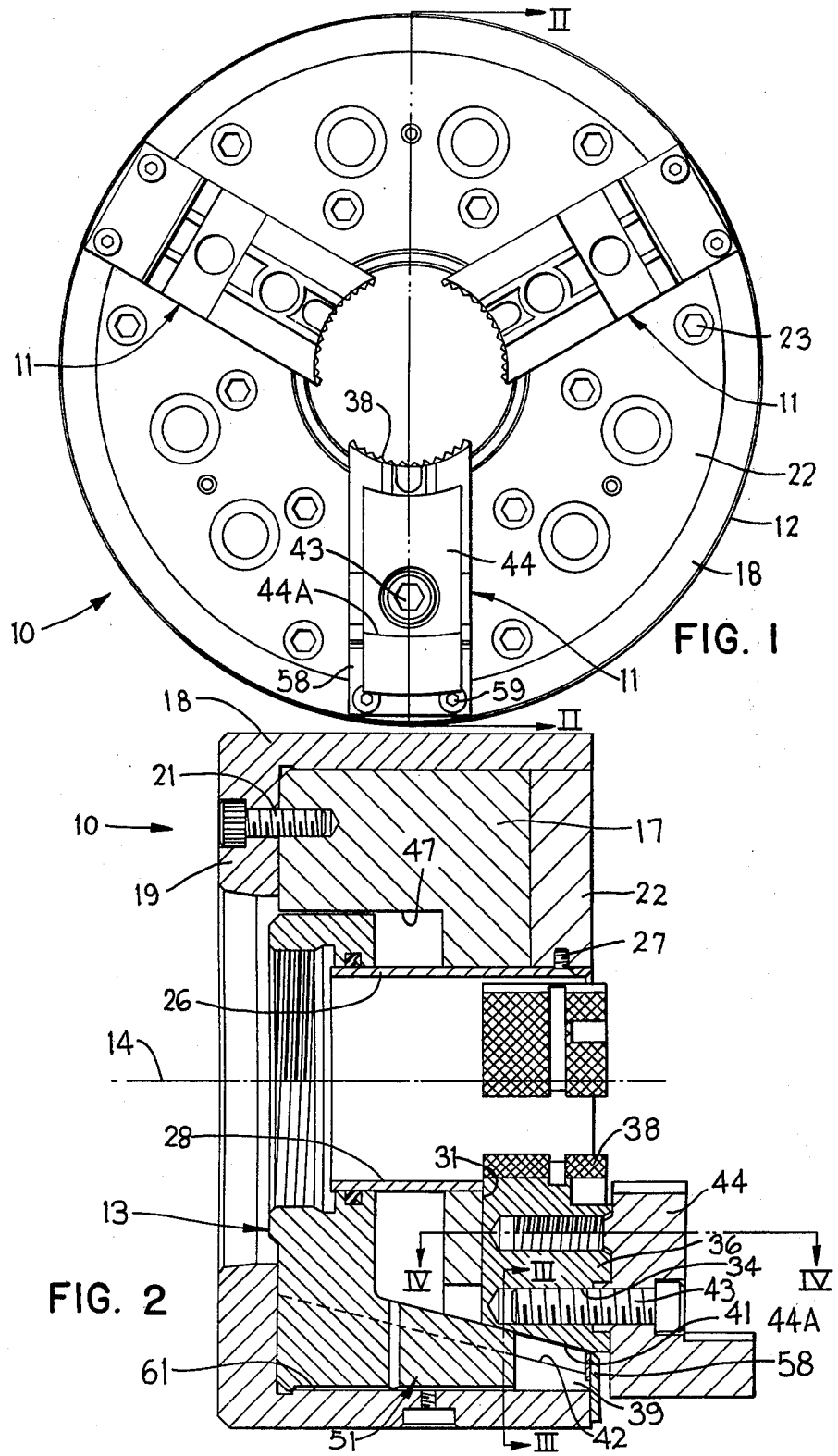

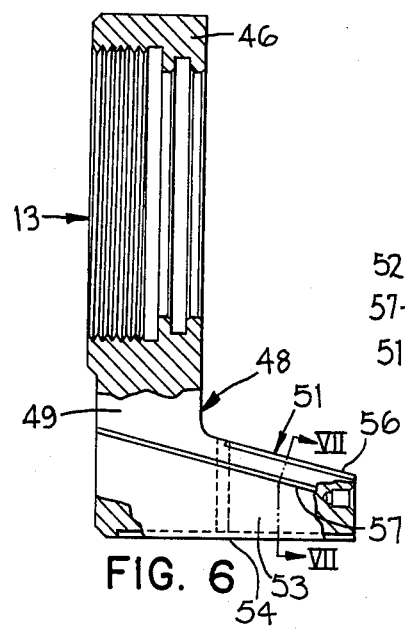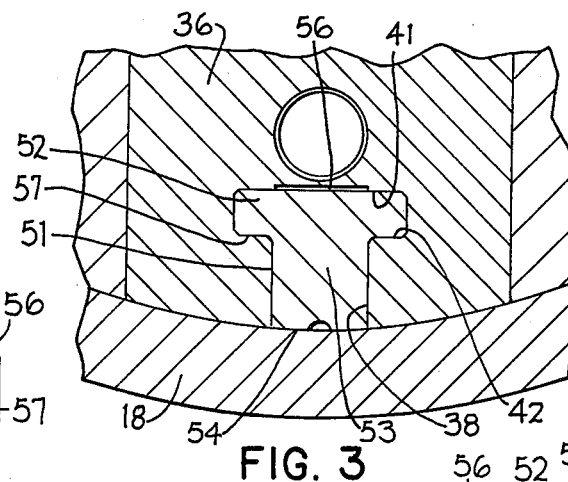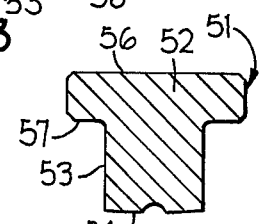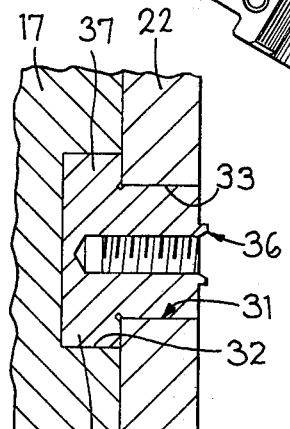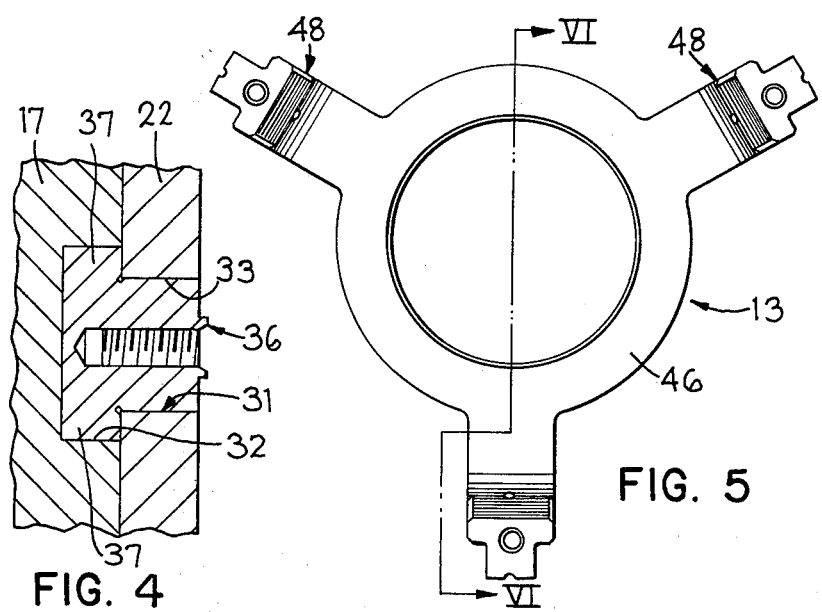

PUSH-TYPE JAW CHUCK

FIELD OF THE INVENTION

This invention relates to an improved jaw chuck and, in particular, to a chuck which employs an improved push-type actuator arrangement for radially inwardly moving the jaws for effecting gripping engagement with the outer diameter of a workpiece.

BACKGROUND OF THE INVENTION

U.S. Pat. No. 4,123,075, owned by the assignee of this invention, discloses a jaw chuck which has proven highly desirable for use at high rotative speeds. This chuck uses axially movable wedges for effecting radial gripping engagement of the jaws, with the jaw assemblies being confined within a continuous surrounding cylindrical housing which structurally reacts with the jaw assemblies for resisting the centrifugal forces imposed on the jaws. This prior chuck hence maintains a proper gripping engagement with the workpiece without requiring complex linkages or movable weights for effecting centrifugal balance.

However, the aforesaid chuck is of the "pull" type, that is, the actuator wedges are pulled axially rearwardly away from the jaw-carrying front face in order to displace the jaws radially inwardly into gripping engagement with the workpiece outer diameter. While jaw chucks of this general type have conventionally utilized a pull-type actuator, nevertheless it has been observed that this type arrangement possesses several disadvantages, as follows:

1. The external load imposed on the workpiece is spaced forwardly from the jaws, and hence this load creates an axial tilting moment which creates a tendency for the jaws to open. The pull-type actuator wedge, which causes inward radial displacement of the jaws for gripping engagement with the workpiece, also imposes an axial tilting moment on the jaw which acts in the same rotational direction as the tilting moment created by the external load, and hence these two tilting moments tend to reinforce one another so that secure gripping of the workpiece is made more difficult. This also often damages the workpiece due to the outer corner or edge of the jaw "biting" into the workpiece.

2. The wedge actuator is moved rearwardly to activate the jaws, and since the jaws are disposed closely adjacent the front face of the housing, the actuator wedge is normally in slidable engagement with the respective jaw carrier throughout substantially the full axial extent thereof only when in a non-activated position. The axial extent of engagement between the wedge and jaw carrier decreases as the jaw is displaced radially inwardly, so that the wedging engagement between the activator wedge and jaw carrier normally occurs solely adjacent the rearward side of the jaw carrier when the latter is grippingly engaged with the workpiece. This thus minimizes the desired force-transfer area between the wedge and jaw carrier, and also results in the activating force being positioned greatly off-center, whereby the force-transfer arrangement relative to the jaw carrier is less than optimum.

3. The aforesaid force-transfer arrangement between the wedge and jaw carrier normally results in some of the components within the activator and jaw assemblies being subjected to tension stresses, and hence the overall assemblies are more subject to breakage or failure.

Thus, this invention relates to an improved jaw chuck which overcomes the above-mentioned disadvantages. More specifically, this improved jaw chuck permits the jaws to be radially inwardly moved for gripping engagement with the outer periphery of a workpiece, but the jaw assemblies are activated by a push-type actuator assembly which maintains the jaws in gripping engagement with the workpiece, while at the same time this improved chuck is still highly desirable for use at high rotational speeds in view of its ability to maintain effective gripping between the jaws and the workpiece in resistance to the centrifugal forces imposed on the jaw.

In this improved jaw chuck, the activating wedge moves forwardly into a more intimate wedging relationship with the jaw carrier to effect inward displacement of the latter for gripping the workpiece, such that the activator wedge is in secure engagement with the respective jaw carrier over substantially the full axial extent thereof when the jaw grippingly engages the workpiece. The forces imposed on the jaw carrier are thus more effectively centered so as to provide for more optimum force-transfer through the jaw assemblies to the workpiece. This arrangement also results in the actuator wedge imposing on the jaw carrier an axial twisting moment which effectively opposes the external moment imposed thereon by the workpiece, so that more effective gripping of the workpiece is achieved. This improved arrangement also results in the actuator and jaw assemblies being subjected substantially solely to compression forces when the jaws grippingly engage the workpiece, whereby the possible occurrence of a structural failure is greatly minimized.

In the improved jaw chuck of this invention, there is provided an inner sleevelike housing which, at the forward end, is provided with radially extending T-shaped slots which slidably accommodate the jaw assemblies, which jaw assemblies have gripping means for engaging the exterior periphery of a workpiece. The inner sleevelike housing is totally surrounded and fixedly connected to an outer sleevelike housing which overlaps the outer ends of the slots. A push-type activator is disposed adjacent the rearward end of the inner sleevelike housing and is axially slidable relative thereto. This activator includes wedges which project axially forwardly and are slidably and wedgably engaged with the jaw carriers for effecting radial displacement of the latter. The wedges have the outer peripheries thereof axially slidably supported on the inner periphery of the outer sleevelike housing. The wedges are of a T-shaped cross section and are slidably engaged with similar T-shaped grooves which extend axially through the jaw carriers, which wedges and grooves are sloped at a small angle relative to the axial direction as they project toward the front side of the chuck.

The objects and purposes of this invention will be more apparent after reading the following specification and inspecting the accompanying drawings.

BRIEF DESCRIPTION OF THE DRAWINGS

FIG. 1 is a front face view of a jaw chuck incorporating this invention.

FIG. 2 is a sectional view taken along line II—II in FIG. 1.

FIGS. 3 and 4 are fragmentary sectional views taken respectively along lines III—III and IV—IV in FIG. 2.

FIG. 5 is a front view of the actuator.

FIG. 6 is a sectional view taken along line VI—VI in FIG. 5.

FIG. 7 is a sectional view taken along line VII—VII in FIG. 6.

Certain terminology will be used in the following description for convenience in reference only, and will not be limiting. For example, the words "upwardly", "downwardly", "leftwardly" and "rightwardly" will refer to directions in the drawings to which reference is made. The word "front" will have reference to the exposed face of the chuck having the jaws mounted thereon, as appearing in FIG. 1, and the rightward face as appearing in FIG. 2. The words "inwardly" and "outwardly" will refer to directions toward and away from, respectively, the geometric center of the chuck and designated parts thereof. Said terminology will include the words specifically mentioned, derivatives thereof, and words of similar import.

DETAILED DESCRIPTION

Referring to the drawings, and particularly FIGS. 1 and 2, there is illustrated a jaw chuck arrangement 10 incorporating therein the features of this invention. This jaw chuck arrangement includes a plurality, here three, of jaw assemblies 11 which are uniformly angularly spaced apart and are radially movably supported on a body structure 12. An actuator 13 is slidably supported within the body structure 12 for controlling radial displacement of the jaw assemblies 11. The chuck arrangement 10 is adapted to be attached to a machine tool, such as a lathe, by having the body structure 12 connected thereto by utilization of conventional structure, whereby the chuck arrangement 10 is thus disposed for rotation about its longitudinal axis 14.

The body structure 12 includes, as shown in FIG. 2, an inner substantially cylindrical, sleevelike body 17, which in turn is surrounded and snugly embraced by and outer sleevelike body 18. This outer body 18 extends axially over the complete length of the inner body 17 and, in fact, projects axially forwardly beyond the front face of the inner body. An annular flange 19 is integral with the outer body adjacent the rearward end and projects radially inwardly so as to overlap the inner body, with the inner and outer bodies being fixed together by screws 21. The inner body 17 also has a front plate 22 fixed thereto, as by screws 23. This inner body 17 and front plate 22, in the illustrated embodiment, are each formed as three separate arcuate portions which extend angularly between each adjacent pair of jaw assemblies and function to slidably retain the jaw assemblies within T-shaped slots, as explained hereinafter.

Body structure 12 also includes an inside sleeve 26 snugly disposed within the interior of the inner body 17. Sleeve 26 is suitably secured, as by set screws 27, to the front plate 22. This inner sleeve 26 defines a central bore or opening 28 which extends axially through the chuck and accommodates an elongated workpiece, such as a bar or tube.

These latter-described parts which make up the inner portion of the body structure, namely the inner body 17, front plate 22 and inside sleeve 26, have three T-shaped slots 31 formed in the front face thereof and extending radially between the inner and outer peripheries thereof. Each of these slots 31 includes a head portion 32 which is formed in the inner body 17 directly adjacent the front face thereof, which head portion communicates with a narrower base portion 33 which opens outwardly through the front plate 22. Each T-shaped slot 31 radially slidably accommodates one of the jaw assemblies 11, which jaw assembly projects radially through the front face of the body structure and also projects radially inwardly beyond the inner sleeve 26.

The jaw assemblies 11 may be identical and each includes a jaw carrier 36 which, in cross section, is generally T-shaped so as to be slidably retained within the respective T-shaped slot 31. For this purpose, the jaw carrier 36 has sidewardly-projecting flanges 37 adjacent the rear side thereof, which flanges define the head of the T-shape. The radially inner end of jaw carrier 36 may have a suitable gripping surface 38 thereon for gripping rodlike workpieces which project into or through the chuck. The radially outer end of jaw carrier 36 has a T-shaped groove 39 extending axially therethrough. This T-shaped groove 39 is disposed so that the enlarged head thereof is positioned radially inwardly from the outer edge of the jaw carrier, and the base portion of this T-shaped groove opens radially outwardly through the radially outer surface of the jaw carrier, as illustrated by FIGS. 2 and 3. This T-shaped groove has the head portion thereof defined between inner and outer reaction surfaces 41 and 42, respectively. These surfaces 41 and 42, and hence the longitudinal direction of the T-shaped groove 39, are sloped radially outwardly at a small angle relative to the axis 14 as the groove projects toward the forward face (that is, the rightward face in FIG. 2) of the chuck arrangement. The slope of this T-shaped groove 39 is typically approximately 14° so as to create a self-locking angle, although the slope may vary depending on the design parameters.

Each jaw carrier 36 is designed to mount a jaw 44 thereon, only one said jaw 44 being shown in FIGS. 1-2. The jaw 44 is fixedly secured to its respective carrier 36, such as by one or more screws 43 which engage suitable threaded openings 34 formed in the carrier. The jaw 44 is positioned outwardly or forwardly from the front face of the chuck, and has a suitable inwardly-directed gripping surface 44A for engaging and supporting a workpiece adjacent the front face of the chuck.

The radial movement of jaw assemblies 11 is controlled by the axially movable actuator 13 which, as illustrated in FIGS. 5-7, includes a central ring or hub 46 which is internally threaded. This hub 46 is axially slidably confined within a rearwardly-opening recess 47 formed in the inner body 17 adjacent the rearward end thereof. The hub 46 is suitably connected to an external power mechanism, such as a fluid pressure cylinder, for permitting powered axial displacement thereof. This power mechanism, in the present invention, is such as to impose an axial pushing force on the hub 46, which axial pushing force is directed rightwardly in FIG. 2.

The actuator 13 has three axially-projecting wedges 48 fixedly associated therewith, which wedges 48 are uniformly angularly spaced apart and thus individually cooperate with a respective one of the jaw assemblies 11. Each wedge 48 is of a substantially L-shaped configuration and includes an inner mounting portion 49 which is secured to the hub 46 and projects radially therefrom. An axially elongated wedge portion 51 then projects axially forwardly from the mounting portion 49. The wedge portion 51 has a substantially T-shaped cross section which is oriented such that the enlarged head portion 52 thereof is disposed radially innermost, whereas the base portion 53 projects radially outwardly from the head portion 52.

The wedge portion 51 has an outer surface 54 which extends axially throughout the length of the wedge portion, which outer surface 54 defines the radially outer end of the base portion 53. This outer surface 54 is generated on a radius which is substantially equal to the inner radius of the outer housing 18, so that the surface 54 is thus axially slidably supported on the inner surface 61 of the outer housing 18.

The head portion 52 of the T-shaped wedge defines thereon an inner pushing surface 56 and an outer pulling surface 57, which surfaces are substantially parallel and are sloped radially outwardly at a small angle relative to the axis 14 as they project axially toward the front of the chuck arrangement. These surfaces, and hence the head of the T-shaped wedge 51, are thus sloped at a small angle which is identical to the slope of the T-shaped groove 39. In fact, the forward end of the T-shaped wedge 51 projects into the rearward end of the groove 39, as illustrated by FIG. 2, when the jaws are disposed in their radially outermost position.

To close off the radially outer end of the T-shaped slot 31 when the respective jaw carrier 36 is displaced radially inwardly, there is provided a small closure plate 58 which is secured to the outer housing 18 by screws 59. This closure plate projects radially inwardly a limited extent over the radially outer end of the slot so as to close off any opening or gap which is created when the jaws are displaced radially inwardly.

OPERATION

Turning now to the operation of the chuck arrangement, same is illustrated in FIGS. 1 and 2 in a released position wherein the jaw assemblies 11 are disposed in their radially outermost positions. In this released position, the radially outer ends of jaw carriers 36 are disposed substantially in contact with the inner periphery of the outer body 18, and the actuator hub 46 is retracted rearwardly (leftwardly in FIG. 2) a maximum extent so that it is disposed substantially in abutting engagement with the housing flange 19. In this released and retracted position, the forward free ends of the T-shaped wedges 51 slidably project into the jaw grooves 39 through only a limited extent, as illustrated by FIG. 2.

To utilize the chuck arrangement, a workpiece is positioned adjacent the front face of the chuck arrangement so as to be partially positioned within the region bounded by jaws 44. The power cylinder or device (not shown) associated with the machine tool is then activated to axially push the actuator 13 forwardly (rightwardly in FIG. 2). This results in the T-shaped wedges 51 being slid axially forwardly along the inner peripheral wall 61 of outer housing 18 so that the wedges 51 are thus moved axially into the jaw grooves 39 through a greater extent. Due to the skewed or sloped relationship of the groove 39 and wedge 51 relative to the axis 14, the inner pushing surface 56 on the wedge 51 reacts against the inner reaction surface 41 on the jaw carrier 36 and causes the latter to be slidably displaced radially inwardly along its respective slot 31 in response to the continued forward axial displacement of the wedge 51. This radially inward displacement of jaw carrier 36, coupled with the forward axial displacement of wedge 51, continues until the surface 44A on jaw 44 grippingly engages the outer diameter of the workpiece. Continual pushing pressure or force is exerted forwardly (rightwardly in FIG. 2) on the actuator 13 which, reacting through the wedge portions 51 onto the jaw carriers 36, thus causes the jaws 44 to be securely maintained in gripping engagement with the workpiece so as to permit rotation of the workpiece in synchronization with the chuck. With the workpiece so gripped, the wedge 51 extends axially through at least a major portion of the axial length of the jaw slot 39, and hence the radial gripping forces which are transmitted from the wedges 51 to the jaws 44 are more effectively centered on the jaws so as to provide for optimum gripping of the workpiece. At the same time, the axially-directed force imposed by the wedge 51 on the jaw carrier 36 is directed axially forwardly and hence tends to impose a counterclockwise twisting moment on the lower jaw 44 as illustrated in FIG. 2, which thus tends to oppose the clockwise twisting moment which would be imposed on the jaw 44 due to application of an external force on the workpiece at a location disposed forwardly of the chuck.

In addition, during high speed rotation of the chuck, radially-directed centrifugal forces are transmitted directly to the surrounding outer housing 18 inasmuch as the jaw carrier 36 is a relatively solid and unitary body which bears radially directly against the wedge 51, which in turn bears radially directly against the outer body 18.

Inasmuch as the angled or skewed relationship of the wedge 51 and slot 39 normally extends forwardly at a slope of approximately 14° relative to the axial direction, this angle is substantially self-locking and hence the radially outwardly directed centrifugal forces are unable to effect release of the jaws.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A rotatable jaw chuck arrangement, comprising:
    sleevelike body means rotatable about its longitudinally extending axis, said body means defining thereon a front face adjacent one axial end thereof, and a plurality of guide slots projecting radially of said body means;
    said body means including an inner sleevelike housing having said slots formed therein, said slots opening axially outwardly through said front face, said body means also including an outer sleevelike housing which is fixed to and snugly surrounds the inner housing so that said outer housing overlaps and closes off the radially outer ends of said slots;
    a plurality of jaw carriers radially slidably supported within said slots directly adjacent said front face, said jaw carriers having means associated therewith for gripping engagement with the outer periphery of a workpiece;
    an actuator axially slidably supported on said body means adjacent the rearward end thereof, said actuator including a plurality of wedges projecting axially forwardly therefrom and being axially slidably engaged with said jaw carriers for effecting radial displacement thereof, the actuator and the wedges fixedly associated therewith being axially movable between a released position and a workpiece position, said actuator being moved axially forwardly when being displaced from said released position toward said workpiece-gripping position;

said wedges being sloped radially outwardly as they project axially toward said front face and being slidably engaged with similar sloped surfaces on the jaw carriers so that the jaw carriers are radially displaced inwardly for gripping engagement with a workpiece in response to a forwardly-directed pushing force imposed on the actuator;

said jaw carriers having sloped grooves extending axially therethrough for slidably receiving therein the respective wedge, said sloped grooves extending axially forwardly substantially to said front face, said sloped grooves also opening radially outwardly through the radially outer periphery of said jaw carriers, each said wedge when in said released position being disposed with the front free end portion thereof projecting only slightly into the groove of its respective jaw carrier, and each said wedge when the actuator is in said workpiece-gripping position being disposed so that its front free end portion projects into the groove of the respective jaw carrier through an axial distance which substantially exceeds a majority of the axial extent thereof; and said wedges having an outer peripheral surface which is axially slidably supported directly on said outer housing on the portion thereof which is radially aligned with and closes off the radially outer ends of said slots.

2. A jaw chuck arrangement according to claim 1, wherein said jaw carrier comprises an integral one-piece carrier member having said sloped surface formed thereon at the bottom of the respective groove, and said wedge being an integral one-piece member having an axially sloped inner peripheral surface disposed in direct sliding wedging engagement with said sloped surface, the free end portion of said wedge being directly radially aligned with and directly radially compressed between said carrier member and that portion of said outer housing which closes off the radially outer end of the respective slot to form a substantially solid radially oriented structure between said jaw carrier and said outer housing for permitting direct transmission of radial compression forces from said carrier member to said outer housing.

3. A jaw chuck construction according to claim 2, wherein said gripping means comprises a plurality of jaw members positioned forwardly of but closely adjacent said front face, one of said jaw members being fixedly but removably attached to each said carrier member, each said jaw member having a radially inwardly facing gripping surface for gripping engagement with the outer periphery of a workpiece.

4. A jaw chuck arrangement according to claim 1, wherein the wedge has a T-shaped cross section defined by a circumferentially enlarged head portion which is positioned radially innermost and is joined to a leg portion which is of reduced circumferential extent and which projects radially outwardly from the head portion, and wherein the groove which extends axially through each said jaw carrier is also of a T-shaped cross section corresponding to the T-shape of the wedge, the T-shaped groove in the jaw carrier being disposed so that the enlarged head portion is radially innermost and the leg portion of the T-shaped groove extends radially outwardly through the radially outer periphery of the jaw carrier so that the radially outer surface of the wedge is in axial slidable engagement with the inner peripheral wall of the outer housing in direct radial alignment with the slot.

5. A jaw chuck arrangement according to claim 1, wherein said slot has a T-shaped cross section as defined within a plane which extends perpendicular with respect to the radial direction of the slot, the T-shaped cross section of said slot being defined by an enlarged head portion of said slot which is spaced rearwardly from said front face and which is joined to a leg portion of said slot which is of reduced width and which projects axially forwardly for communication with said front face, and said jaw carrier having a T-shaped cross section which substantially corresponds to the cross-sectional shape of said slot.

* * * * *

UNITED STATES PATENT AND TRADEMARK OFFICE
CERTIFICATE OF CORRECTION

PATENT NO. : 4 403 782

DATED : September 13, 1982

INVENTOR(S) : James R. Buck

It is certified that error appears in the above-identified patent and that said Letters Patent is hereby corrected as shown below:

Column 6, line 66; change "piece" to ---piece-gripping---

Signed and Sealed this

Third Day of April 1984

[SEAL]

Attest:

GERALD J. MOSSINGHOFF

Attesting Officer

Commissioner of Patents and Trademarks